United States Patent
Katzer et al.

(10) Patent No.: US 8,595,452 B1
(45) Date of Patent: Nov. 26, 2013

(54) SYSTEM AND METHOD FOR STREAMING DATA CONVERSION AND REPLICATION

(75) Inventors: Robin D. Katzer, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1982 days.

(21) Appl. No.: 11/290,707

(22) Filed: Nov. 30, 2005

(51) Int. Cl.
*G06F 12/00* (2006.01)
*G06F 7/00* (2006.01)

(52) U.S. Cl.
USPC ............ 711/162; 707/619; 707/E17.124; 711/E12.103

(58) Field of Classification Search
USPC ................................ 711/162; 707/619
See application file for complete search history.

(56) References Cited

U.S. PATENT DOCUMENTS

| | | | |
|---|---|---|---|
| 5,550,987 A | 8/1996 | Tanaka | |
| 5,828,884 A | 10/1998 | Lee et al. | |
| 5,896,534 A * | 4/1999 | Pearce et al. | 710/17 |
| 5,898,896 A | 4/1999 | Kaiser et al. | |
| 5,907,865 A | 5/1999 | Moyer | |
| 5,948,099 A | 9/1999 | Crawford et al. | |
| 5,961,640 A | 10/1999 | Chambers et al. | |
| 6,341,345 B1 | 1/2002 | Auslander et al. | |
| 6,347,396 B1 * | 2/2002 | Gard et al. | 717/168 |
| 6,351,750 B1 | 2/2002 | Duga et al. | |
| 6,549,978 B2 | 4/2003 | Mansur et al. | |
| 6,725,369 B1 | 4/2004 | Farmer et al. | |
| 6,772,320 B1 | 8/2004 | Raj | |
| 2001/0029542 A1 * | 10/2001 | Nishimura | 709/231 |
| 2002/0133507 A1 * | 9/2002 | Holenstein et al. | 707/200 |
| 2003/0131027 A1 * | 7/2003 | Holenstein et al. | 707/201 |
| 2004/0010669 A1 * | 1/2004 | Nishimura et al. | 711/162 |
| 2005/0184886 A1 * | 8/2005 | Fauque | 341/50 |
| 2005/0198483 A1 * | 9/2005 | Park et al. | 712/300 |
| 2006/0218363 A1 * | 9/2006 | Palapudi | 711/162 |
| 2006/0236004 A1 * | 10/2006 | Yang et al. | 710/66 |

OTHER PUBLICATIONS

AME Info—The ultimate Middle East business resource, "Why Use Replication?", Nov. 2, 2004, 4 pgs., http://www.ameinfo.com/48329.html (Sep. 1, 2005), AME Info FZ LLC.

By Softek, "Choosing the Right Data Replication Technology for Your Business Application," Storage Networking Solutions (SNS) Europe, Jan. 1, 2005, 5 pgs., http://www.snseurope.com/snslink/news/printer-friendly.php?newsid=4675 (Dec. 6, 2007).

Senicka, Jim, Veritas Technical Product Management, "Understanding VERITAS Volume Replicator," Veritas™ Architect Network, Feb. 2005, pp. 1-17, VERITAS Software Corporation, Mountain View, CA.

* cited by examiner

*Primary Examiner* — Reginald Bragdon
*Assistant Examiner* — Aracelis Ruiz

(57) ABSTRACT

A system and method are provided for integrating conversion and replication of a data stream for replicating data stored in a primary data store. The method includes streaming a replicated data stream from the primary data store to a secondary data store. The method includes intercepting the replicated data stream in route to the secondary data store. The method also provides for converting the replicated data stream.

15 Claims, 3 Drawing Sheets

SYSTEM AND METHOD FOR STREAMING DATA CONVERSION AND REPLICATION

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to disaster recovery and data migration, but not by way of limitation, to a system and method for streaming data conversion and replication in an integrated process.

BACKGROUND OF THE INVENTION

In many business enterprises today, reliance on information processing systems grows at an amazing rate. As enterprises become more reliant on information systems and the vast quantities of data stored therein (to the scale of terabytes of data), the losses caused by disruptions and outages become more potentially disastrous. For this reason, many technologies have developed to provide protection against information system failures. Such technologies include storage management, data protection, and application clustering at the local level.

Local protection, however, is inadequate. Loss of an entire data center or information processing facility would greatly impact the business it supports, thus protection at a higher level is necessary. Data replication includes technology designed to maintain a duplicate data set on a completely independent storage system, possibly at a different geographical location from the primary data set. In many systems, the duplicate data set is updated automatically as the primary data set is updated.

There are different, known forms of data replication. In a synchronous replication system, the system ensures that a write update has actually been posted to the secondary data store as well as the primary before the write operation completes at the application level. In a synchronous replication system, the duplicate data set is continuously up-to-date; however, application performance may be affected in that each update requires a "round trip" over the network for the update to the duplicate.

In an asynchronous replication system, the application updates are written at the primary data set and queued for forwarding to the secondary data set as bandwidth allows. Unlike synchronous replication, the writing application does not suffer response time degradation, as there is no wait for the "round trip" to be complete. Near real-time updates are available, though during an outage at the primary data set, transactions that are queued for forwarding, yet incomplete, may be lost.

In addition to the need for data replication as described above, in many cases there is also a need for conversion of the data. Types of conversion that might be necessary include conversion from Big Endian to Little Endian and vice versa, byte size conversion, and character set conversion.

For example, endianess conversion, or byte order conversion, may be necessary. When data is represented by multiple bytes, there is no unique way of ordering the bytes in memory, so the order is subject to a convention called endianess. Some CPUs handle numbers in a format known as big endian. In big endian format, the most significant byte is stored at the lowest memory address. Alternatively, some CPUs handle numbers in a format known as little endian. Little endian format places the least significant byte at the lowest memory address. When a big endian machine and a little endian machine (i.e., one primary data store and its secondary data store back-up) attempt to communicate through reads and writes to each other, the data must be re-formatted to be accessible by the other machine. This conversion between big endian and little endian may be referred to as byte reversal.

Another example of potentially necessary conversion is byte size conversion. Various operating systems may employ different byte sizes that are incompatible with other applications. For example, 64-bit binary data cannot be used by 32-bit applications. 64-bit applications can be compiled and linked on 32-bit systems but cannot be run on them (and vice versa). In order to use the data interchangeably, 32-bit and 64-bit data must be converted from one size to the other when moving between different applications. Such a conversion is referred to as byte size conversion.

Still another example of a type of conversion that may be needed is character set conversion. A character set is the group of unique symbols used for display and printing. Character sets for languages that use the English alphabet generally contain 256 symbols, which is the number of combinations one byte can hold. Given that there are countless different available character sets for different languages and different computing platforms, the need may arise to convert data from one character set to another.

SUMMARY OF THE INVENTION

Systems and methods for running queries in business intelligence databases are provided. Some embodiments provide a data streaming conversion and replication system comprising a primary data store operable for storing data according to a first format, and a secondary data store for maintaining a back-up of the data stored in the primary data store, the back-up in the secondary data store stored according to a second format. The system additionally comprises a network connection coupling the primary data store and the secondary data store. The system also comprises a replicator operable to promote replication of data between the primary data and the secondary data store and a conversion unit operable to convert the data from the first format to the second format. The replicator and the conversion unit are operable for replication and conversion of data substantially streamed between the primary data store and the secondary data store.

Various embodiments provide a conversion unit comprising a processor, a memory storing a conversion algorithm, an inbound network connection streaming data in, an outbound network connection streaming data out. The conversion algorithm, when invoked, causes the processor to intercept a replicated data stream at the inbound network connection, convert the replicated data stream, and resume the replicated data stream, as converted, at the outbound network connection.

Some embodiments provide a method for conversion and replication of a data stream comprising replicating data stored in a primary data store. The method includes converting the replicated data stream from a first format to a second format, and storing the replicated and converted data to a secondary data store. The replicating, converting and storing occur while substantially streaming the data from the primary data store to the secondary data store.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
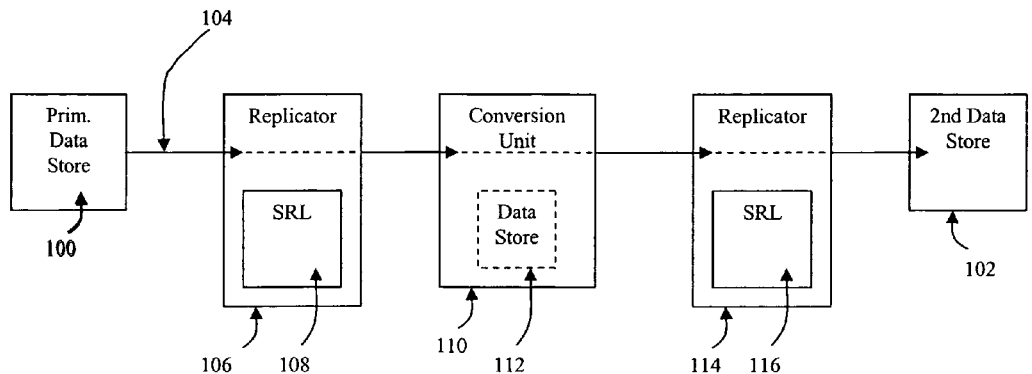
FIG. 1 shows a block diagram of the system for streaming data replication and conversion in accordance with embodiments of the present disclosure.

A block diagram of a system for streaming data replication and conversion in accordance with embodiments of the present invention is shown in FIG. 1. Under various circumstances, it may be desirable to both replicate and convert data in a streaming fashion without inducing outages in access to stored data. For example, an enterprise may need to migrate data from a first data store over to a second data store in order to use less expensive hardware or upgrade their data storage system. In another example, an enterprise may wish to build a disaster recovery back-up for their data storage system, wherein the back-up in secondary data storage is maintained in a different geographical location. The secondary data store in either circumstance may comprise different hardware or operate different software or operating system software, such that conversion is necessary. It is desirable for the enterprise to complete migration or back-up replication in real-time, or as close as possible thereto by streaming the data. It is also desirable to complete migration or back-up replication without inducing outages in access to the store of data being replicated and converted.

As shown in FIG. 1, a primary data store 100 is linked to a secondary data store 102 via a link streaming a data stream 104. The link may be any form of network, such as, for example, a TCP/IP link.

An inbound replicator 106 for replication is employed to carry out replication processes. In an embodiment, the inbound replicator 106 may be a hardware and software combination appliance that is placed in the data stream 104 between the primary data store 100 and the secondary data store 102. In an embodiment, the inbound replicator 106 may be a software solution that is hosted in the primary data store 100 and/or the secondary data store 102. One exemplary software replication solution is the Veritas Volume Replicator™, commercially available from Veritas Software™.

The inbound replicator 106 (either software or software/hardware appliance) may comprise a System Resource Log ("SRL") 108. As data is added to or changed in the primary data store 100 via "writes," each write is captured as a block and written in the SRL 108. The SRL 108 queues all data writes destined for the secondary data store in the case of asynchronous replication as described above. Being manipulated and replicated by the inbound replicator 106, the data stream 104 may comprise, in an embodiment, a stream of synchronously replicated data or, alternatively, asynchronous replicated data.

A conversion unit 110 is present in the system shown in FIG. 1. In an embodiment, the conversion unit 110 may comprise a hardware appliance running an operating system and one or more conversion algorithms. The conversion unit 110 intercepts the data stream 104 outbound from the inbound replicator 106, destined to ultimately be written to the secondary data store 102. In an embodiment, the conversion unit 110 may optionally comprise a data store 112 wherein queued data that has been replicated is stored during conversion. Preferably, the duration of storage is minimized such that the data streams out of the conversion unit 110 at a continuous or near continuous rate to continue towards the secondary data store 102.

The data stream 104 continues from the conversion unit 110 to another outbound replicator 114 where the "writes," as converted, are written to the SRL 116. Finally, the data stream 104 reaches the secondary data store 102, where the replicated, converted data stream 104 is written.

Figure 2:
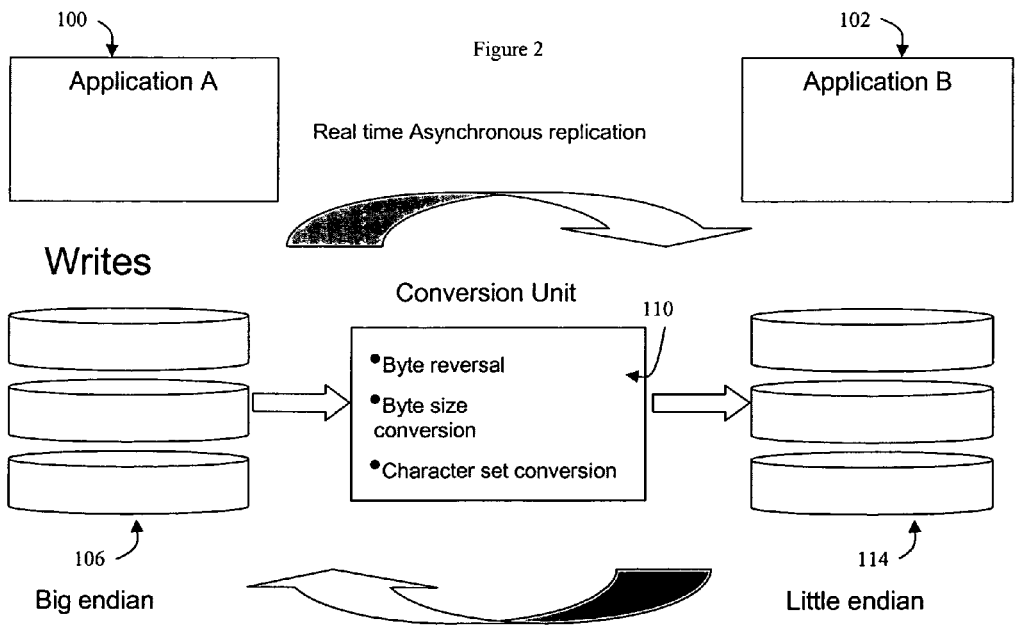
FIG. 2 is a block diagram of an exemplary system employing a replicator commercially available from Veritas.

FIG. 2 illustrates an exemplary system of the current disclosure employing a replicator commercially available from Veritas Software™. Application A is the primary data store 100, and Application B is the secondary data store 102. The conversion unit 110 resides between the two applications, and is operable to perform any one or more of the following operations on data streaming from the inbound replicator 106 on to outbound replicator 114: byte reversal, byte size conversion, and/or character set conversion. In one embodiment, the data stored in application A 100 is replicated on inbound replicator 106 by being written to the SRL (not specifically shown in FIG. 2), and streamed for replication over to the SRL of the other outbound replicator 114. Invisibly to both inbound replicator 106 and outbound replicator 114, the conversion unit 110 intercepts the data stream and performs conversion, including, if necessary, byte reversal such as in the case where application A 100 is of the big endian format and application B 102 is of the little endian format. When the conversion is complete at the conversion unit 110, the data, as converted, continues to stream over to the outbound replicator 114, where it is written to the SRL of outbound replicator 114, and thereby migrated or duplicated to application B 102.

Figure 3:
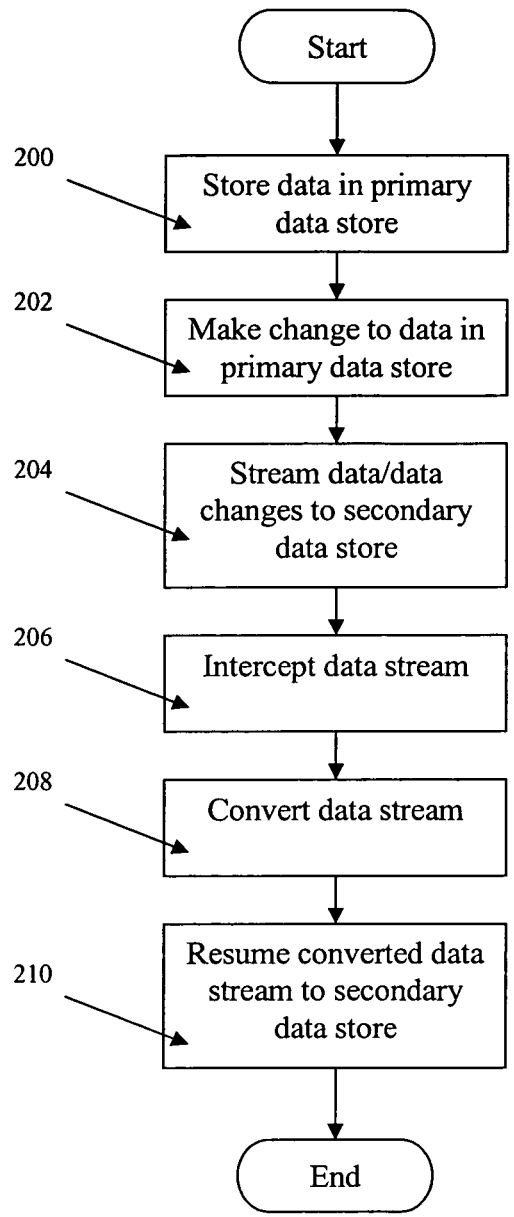
FIG. 3 is a flow chart of a method of replicating and converting data in an integrated streaming process.

A flow diagram of a method for replicating and converting data in an integrated, streaming process in accordance with embodiments of the present invention is shown in FIG. 3. The process starts by storing data in the primary data store 100 (block 200). In the information driven market of today, even over a short period of time, an enterprise may generate vast amounts of critical data (on the scale of terabytes of data), and store it in a primary data store 100. The stored data may comprise critical business or customer information that the enterprise cannot afford to lose or temporarily go without for any reason. The enterprise may wish to duplicate and convert the data for disaster recovery purposes, storing a duplicate of the data in a different geographical location, possibly in a different format (whether a different byte size, different byte order, or different character set). The enterprise may wish to migrate the data stored to a new, upgraded system, possibly in a different format, requiring duplication and conversion of the vast amount of data. In order for the duplicate to be of any business value, given the rate of incoming new data and/or changes, the data and all changes and/or additions to the data should be replicated and converted to the format of the secondary storage in real-time or as close as possible thereto.

The process continues as data is changed or added to in the primary data store 100 (block 202). With each change or addition, a "write" is performed to the inbound replicator 106. Data is streamed from the primary data store 100 to the secondary data store 102 in a data stream 104 (block 204). The data stream 104 is replicated, according to the various techniques that are well-known in the art, as it passes through the inbound replicator 106. A conversion unit 110 intercepts the data stream 104 when it passes through the inbound replicator 106 on the inbound side of the conversion unit 110 (i.e., the side where the data stream 104 is streaming from the primary data store 100 to the conversion unit 110) (block 206). The conversion unit 110 may temporarily store "writes" that are queued for streaming to the secondary data store 102; the "writes" may be stored in a data store 112 of the conversion unit 110.

The conversion unit 110 converts the data stream 104 in a streaming manner that converts data a byte at a time (block 208). In an embodiment, the conversion process may be byte order reversal to change the format of the data from big endian to little endian, or little endian to big endian, when the primary data store 100 and the secondary data store 102 employ different formats. In an embodiment, the conversion process may be character set conversion, when the primary data store 100 and the secondary data store 102 employ varying character sets. In an embodiment, the conversion process may be byte size conversion, when the primary data store 100 and the secondary data store 102 employ different data size formats. Various techniques to accomplish each of the different types of conversion are well known in the art. In one embodiment, the present disclosure combines and accomplishes the replication and conversion processes in a streaming byte-by-byte manner.

Having been converted, the data stream 104 resumes streaming to the secondary data store (block 210). In completing the replication process, the "writes," having been converted by the conversion unit 110, may be written to an SRL 116 of a outbound replicator 114 on the outbound side of the conversion unit 110 (i.e., the side where the data stream 104 is streaming from the conversion unit 110 to the secondary data store 102). The "writes" are finally written to the secondary data store 102 (block 212).

In an embodiment, the inbound replicator 106 and the outbound replicator 114 may maintain the data stream 104 without perceiving the interception and conversion occurring mid-stream at the conversion unit 110. That is, the conversion unit 110 may be provided coupled such that it is transparent to the inbound and outbound replicators 106 and 114, respectively, as the conversion unit 110 converts the data stream 104 without impacting or awareness by the inbound and outbound replicators 106 and 114. The conversion unit 110 may be thought of as transparent since it does not necessarily communicate with the replicators 106 and 114 by requesting information of or receiving or responding to requests from the replicators 106 and 114, and may only passively convert the data stream 104 without interacting with the replicators 106 and 114. The same may be said of the conversion unit 110, that it is not aware of the inbound and outbound replicators 106 and 114.

The conversion unit 110 may be provided such that it automatically converts the stream from one format to another, such as converting the data stream from a first format to a second format in one direction and vice versa when the stream travels in the reverse direction. In some embodiments, the conversion unit 110 may intelligently intercept and convert the stream depending on the format of the stream, for example, based on the destination, such as storage device where the data will be stored, or mapping of the data format that the data will be stored in. In other embodiments, the present system or another system may provide the data and include a request that triggers the conversion unit 110 to convert a particular data stream. In other embodiments other techniques for determining and initiating conversion of the data may be employed.

Figure 4:
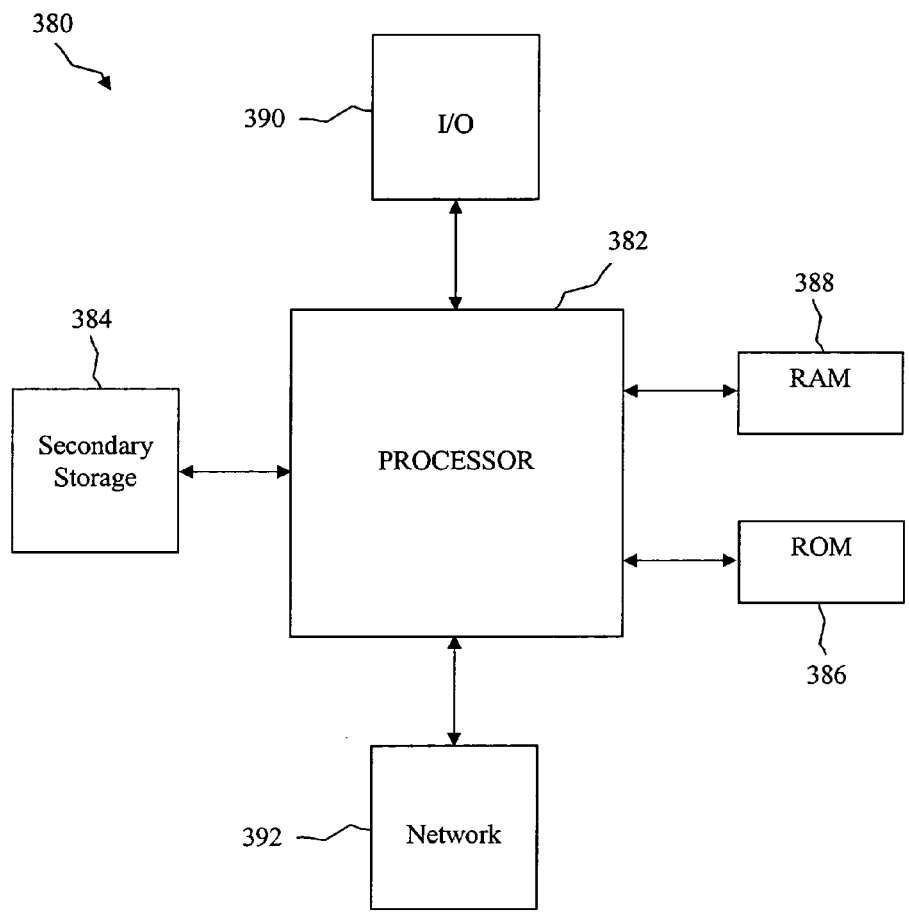
FIG. 4 is a block diagram of a general-purpose computer system suitable for implementing one or more embodiments of the present disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A data streaming conversion and replication system, comprising:
    a primary data store that stores data according to a first format;
    a secondary data store that maintains a back-up of the data stored in the primary data store, the back-up in the secondary data store stored according to a second format;
    a network connection coupling the primary data store and the secondary data store;
    a replicator that automatically replicates data between the primary data store and the secondary data store as changes are made to the data stored in the primary data store;
    a conversion unit that converts the data from the first format to the second format, wherein the conversion unit is transparent to the replicator, the primary data store, and the secondary data store, and wherein the conversion unit is transparent by passively converting the data without interacting with the replicator, the primary data store, and the secondary data store; and
    the replicator and the conversion unit replicate and convert the data substantially streamed between the primary data store and the secondary data store.

2. The system of claim 1, the replicator performs real-time asynchronous replication.

3. The system of claim 1, wherein the conversion unit performs byte reversal.

4. The system of claim 1, wherein the conversion unit performs byte size conversion.

5. The system of claim 1, wherein the conversion unit performs character set conversion.

6. The system of claim 1, the replicator further comprising replication software hosted at the primary data store and the secondary data store.

7. The system of claim 6, the replicator further comprising one or more storage resource logs, wherein changes to data stored in the primary data store are written to a first storage resource log, streamed to a second storage resource log and stored in the secondary data store.

8. A conversion unit, comprising:
    a processor;
    a memory storing a conversion algorithm;
    an inbound network connection streaming data in from a first data store;
    an outbound network connection streaming data out to a second data store;
    wherein the conversion algorithm, when invoked, causes the processor to:
    intercept a replicated data stream at the inbound network connection;
    convert the replicated data stream; and
    resume the replicated data stream, as converted, at the outbound network connection,
    wherein the conversion unit is transparent to any functional component to which it is connected via the inbound network connection or the outbound network connection; and
    wherein the conversion unit is transparent by passively converting the replicated data stream without interacting with any functional component to which it is connected via the inbound network connection or the outbound network connection.

9. The conversion unit of claim 8, wherein the conversion algorithm, when invoked, causes the processor to convert the replicated data stream, byte-by-byte, from one endianess format to the other.

10. The conversion unit of claim 8, wherein the conversion algorithm, when invoked, causes the processor to convert the replicated data stream, byte-by-byte, from one character set to another.

11. The conversion unit of claim 8, wherein the conversion algorithm, when invoked, causes the processor to convert the replicated data stream, byte-by-byte, from one byte size format to another.

12. A method for conversion and replication of a data stream, comprising:
    adding or changing data in a primary data store via writes to the primary data store;
    replicating each of the writes to the primary data store byte-by-byte as the data in the primary data store is added or changed;
    streaming the replicated writes in a replicated data stream;

receiving the replicated data stream in route from the primary data store to a secondary data store;

converting the received replicated data stream byte-by-byte from a first format to a second format;

streaming the converted replicated data stream to the secondary data store; and storing the replicated, received, and converted data to the secondary data store, wherein the replicating, receiving, converting and storing occur while substantially streaming the data from the primary data store to the secondary data store, and wherein receiving the replicated data stream includes intercepting the replicated data stream, wherein intercepting the replicated data stream is transparent to the primary data store and the secondary data store, and wherein intercepting the replicated data stream is transparent by passively converting the replicated data stream without interacting with the primary data store and the secondary data store.

13. The method of claim 12, wherein replicating data further comprises real-time asynchronous replication.

14. The method of claim 12, wherein converting the replicated data stream further comprises one or more of performing byte reversal, performing byte size conversion, and performing character set conversion.

15. The method of claim 12, wherein replicating each of the writes minimally induces loss or significant reduction in access to the primary data store.

* * * * *